United States Patent
Abedi et al.

(10) Patent No.: US 11,824,658 B2
(45) Date of Patent: Nov. 21, 2023

(54) CHANNEL DISRUPTION WIRELESS COMMUNICATION SYSTEM

(71) Applicants: Ali Abedi, Waterloo (CA); Timothy Benedict Brecht, Waterloo (CA); Farzan Dehbashi, Waterloo (CA); Mohammad Hossein Mazaheri Kalahrody, Waterloo (CA); Omid Salehi-Abari, Waterloo (CA)

(72) Inventors: Ali Abedi, Waterloo (CA); Timothy Benedict Brecht, Waterloo (CA); Farzan Dehbashi, Waterloo (CA); Mohammad Hossein Mazaheri Kalahrody, Waterloo (CA); Omid Salehi-Abari, Waterloo (CA)

( * ) Notice: Subject to any disclaimer, the term of this patent is extended or adjusted under 35 U.S.C. 154(b) by 505 days.

(21) Appl. No.: 17/262,506

(22) PCT Filed: Jul. 25, 2019

(86) PCT No.: PCT/CA2019/051031
§ 371 (c)(1),
(2) Date: Jan. 22, 2021

(87) PCT Pub. No.: WO2020/019082
PCT Pub. Date: Jan. 30, 2020

(65) Prior Publication Data
US 2021/0288755 A1    Sep. 16, 2021

Related U.S. Application Data

(60) Provisional application No. 62/703,348, filed on Jul. 25, 2018.

(51) Int. Cl.
*H04L 27/28* (2006.01)
*H04L 1/1607* (2023.01)
*H04W 4/80* (2018.01)
*H04L 25/02* (2006.01)

(52) U.S. Cl.
CPC ........ *H04L 1/1678* (2013.01); *H04L 25/0202* (2013.01); *H04W 4/80* (2018.02)

(58) Field of Classification Search
CPC ... H04L 67/535; H04L 67/54; H04L 25/0202; H04W 4/38; H04W 4/80; H04W 4/029
(Continued)

(56) References Cited

U.S. PATENT DOCUMENTS 5,835,785 A * 11/1998 Overtoom ........... G06F 13/4291
710/110
2008/0288135 A1 * 11/2008 Katrak .................. H04L 9/3297
701/31.4
(Continued)

FOREIGN PATENT DOCUMENTS

EP    3340558    6/2018

OTHER PUBLICATIONS

B. Kellogg, A. Parks, S. Gollakota, J. R. Smith, and D. Wetherall. Wi-fi Backscatter: Internet Connectivity for RF-powered Devices. In SIGCOMM, 2014.
(Continued)

*Primary Examiner* — Khai Tran
(74) *Attorney, Agent, or Firm* — Shin Hung; VanTek IP LLP

(57) ABSTRACT

The wireless channel of the wireless communication system is selectively disrupted or interfered with based on the logical states of the data to be transmitted by an electronic device having no wireless data signal transmitting circuitry. A host device transmits a query packet which includes a header and a series of sub-frames to be received by a receiving device. As each sub-frame is transmitted, the electronic device can selectively disrupt the wireless channel by changing its characteristics such that the receiving device can no longer decode that sub-frame based on channel
(Continued)

estimation from the header of the frame. Wireless channel disruption occurs in response to a specific state of the bit of data of a message to be communicated by the electronic device. The receiving device then issues a status reply to the host device indicating which sub-frames are decodable and which sub-frames are undecodable based on the initial channel estimation. The host device decodes the status reply to extract the message.

25 Claims, 9 Drawing Sheets

(58) Field of Classification Search
USPC .......................................................... 375/360
See application file for complete search history.

(56) References Cited

U.S. PATENT DOCUMENTS

2014/0301299 A1* 10/2014 Wu ..................... H04L 5/0053
370/329

| 2015/0154432 | A1 | 6/2015 | Abedi |
| 2017/0372102 | A1 | 12/2017 | Knoblauch |

OTHER PUBLICATIONS

P. Zhang, D. Bharadia, K. Joshi, and S. Katti. HitchHike: Practical Backscatter Using Commodity WiFi. In SenSys, 2016.

P. Zhang, C. Josephson, D. Bharadia, and S. Katti. FreeRider: Backscatter Communication Using Commodity Radios. In CoNEXT, 2017.

P. Zhang, M. Rostami, P. Hu, and D. Ganesan. Enabling practical backscatter cmmnunication for on-body sensors. In SIGCOMM, 2016.

J. Zhao, W. Gong, and J. Liu. Spatial Stream Backscater Using Com-modity WiFi. In MobiSys, 2018.

International Preliminary Report on Patentability issued in corresponding international application No. PCT/CA2019/051031 dated Jan. 26, 2021.

International Search Report issued in corresponding international application No. PCT/CA2019/051031 dated Sep. 26, 2019.

* cited by examiner

CHANNEL DISRUPTION WIRELESS COMMUNICATION SYSTEM

CROSS REFERENCE TO RELATED APPLICATIONS

This application claims the benefit of priority of U.S. Provisional Patent Application No. 62/703,348 filed on Jul. 25, 2018, which is hereby incorporated by reference.

FIELD

The present disclosure relates generally to wireless communication. More particularly, the present disclosure relates to wireless communication in a frame aggregation wireless communication system.

BACKGROUND

Wireless communication is a convenient mechanism for people to communicate with each other over short and long distances, either by voice or by messages and text, without the need for cables interconnecting sending and receiving devices.

Machine to machine communication is now very common in today's Internet of Things (IoT) environment, where smart homes or buildings can have numerous devices monitoring various aspects of the internal or immediate external environment for reporting to a user over the Internet, or simply to collect data for later analysis. Automated systems also rely on numerous sensors to collect vital information to help control or direct particular actions by a controller programmed to execute specific algorithms based on the received inputs.

WiFi is a very common wireless local area network (LAN) which enables the above described IoT environment and automated systems. Any WiFi enabled device, such as smart plugs, smart thermostats, smart phones, tablets, computers by example, can communicate with each other and the Internet. While such devices provide a high level of functionality, there is another class of devices which are commonly used to monitor a specific characteristic of their immediate environment. These are sensors which are configured to monitor characteristics such as temperature, flow rate, power level, radiation levels, and so forth.

Such sensors preferably have small form factors, are inexpensive and simple to install. By example, a temperature sensor can be attached with adhesive to a surface of some machinery or article to be monitored. In the life science field, a sensor can be implanted into a person or animal. The sensor can include a power source or can rely on power harvesting from the electromagnetic signals in the air, such as a WiFi signal, or power harvesting from the presence of a temperature differential, to provide the necessary power to operate. Other forms of power harvesting such as solar power for example can also be used for this purpose.

Ideally, these types of sensors are inexpensive to produce, and can operate for a long duration of time before replacement is necessary. In known schemes, the sensor device within a wireless network environment requires at least a wireless transmitter configured to communicate with the wireless communication protocol it is intended to operate within. Therefore, unfortunately, power consumption becomes an issue as the battery will be small and the operating life of the device becomes very short. Current power harvesting techniques do not generate sufficient energy for powering a wireless transmitter to transmit data over any practical distance. By example, security door RFID tags are powered by scavenging energy from a reader device emitting electromagnetic waves, and then transmits its data to the reader for verification. However, the range is limited to several inches.

It is, therefore, desirable to provide a wireless communication system and a device which can operate at low power to transmit its data to a receiving device.

SUMMARY

It is an objective of the present disclosure to obviate or mitigate at least one disadvantage of previous wireless communication systems.

In a first aspect, the present disclosure provides a wireless signal data transmission system. The wireless signal data transmission system includes a host device, a receiver, a device for generating data and a channel disruptor coupled to the device. The host device is configured to transmit a frame in a wireless channel and configured to receive a status reply, where the frame includes a header and a number of aggregated sub-frames transmitted during a first period of time. The receiver is configured to receive the frame and perform channel estimation in response to information in the header of the frame, to decode data of the sub-frames based on the channel estimation, and to transmit the status reply to the host device indicating which sub-frames are decodable and which sub-frames are undecodable based on the channel estimation. The data generated by the device includes a number of data bits each having one of first and second states, where each data bit corresponds to at least one sub-frame of the number of aggregated sub-frames. The channel is configured to selectively change electrical characteristics of the channel sequentially in time in accordance with an order of the number of data bits during a second period of time overlapped by the first period of time, such that the electrical characteristics are changed in response to any bit having the first state to render a transmitted sub-frame in the second period of time undecodable by the receiver. The host device is configured to execute an application to decode the status reply and obtain the data generated by the device based on which sub-frames are decodable and undecodable. In a current embodiment of this first aspect, the wireless signal data transmission system is a WiFi compliant wireless system.

According to another embodiment of this first aspect, the frame includes n sub-frames, where n is an integer value greater than 0. The number of data bits can be n/2, and the frame is a first frame and the host device is configured to repeat transmission of at least one additional frame after the first frame. In this embodiment, the channel disruptor repeats changing electrical characteristics of the channel sequentially in time in accordance with an order of the number of data bits at least once.

According to yet another embodiment of the first aspect, the frame is transmitted at a first time and the channel disruptor begins selectively changing the electrical characteristics of the channel at a second time proximate to the first time. In this embodiment, another frame is transmitted at a third time after the first time, and each sub-frame is time stamped by the host device. The host device is configured to determine a difference in time between the first time and the second time, and adjust the third time by the determined difference.

In a further embodiment of the first aspect, at least two consecutive sub-frames represent one bit of the data. The device is configured to selectively change the electrical characteristics of the channel for a duration of time corresponding to a transmission duration of one sub-frame, followed by a delay corresponding to the transmission duration of one sub-frame before commencing selective changing of the electrical characteristics of the channel for another bit of the data. In this further embodiment, the host device is configured to decode the at least two consecutive sub-frames as representing one state of the bit of data when at least one sub-frame of the at least two consecutive sub-frames is undecodable or decodable.

Alternatively, the device is configured to selectively change the electrical characteristics of the channel for a duration of time corresponding to a transmission duration of the at least two consecutive sub-frames, and to commence selective changing the electrical characteristics of the channel without delay for another bit of the data. The host device is configured to decode the at least two consecutive sub-frames as representing one state of the bit of data when a sub-frame at a specific position of the at least two consecutive sub-frames is undecodable, wherein the specific position is determined by a first occurring sub-frame of the at least two consecutive sub-frames that is undecodable.

In a second aspect, the present disclosure provides an electronic device for communicating a message in a wireless channel with known wireless channel characteristics. The electronic device includes a processing block and a channel disruptor. The processing block is configured to generate data having at least one bit, each of the at least one bit having a first or a second state. The channel disruptor is coupled to the processing block and configured to change the wireless channel characteristics of a signal transmitted in the wireless channel, in response to a bit of the data having the first state. The wireless channel characteristics are changed relative to the known wireless channel characteristics such that the signal is undecodable by a receiver, and the signal is decodable by the receiver when the bit has the second state. According to an embodiment of this second aspect, the wireless channel characteristics include at least one of phase and amplitude.

According to alternate embodiments of this second aspect, the channel disruptor can include an oscillator configured to generate a sine wave at a frequency of the wireless channel with a wide channel width, or an antenna and an RF switch.

Where the channel disruptor includes an intent and an RF switch, the channel disruptor is configured to set the antenna in a non-reflective mode in response to the second state of the bit, and to set the antenna in a reflective mode in response to the first state of the bit. Alternatively, the channel disruptor is configured to set the antenna in a reflective mode with 0 degree phase shift in response to the second state of the bit, and to set the antenna in a reflective mode with 180 degree phase shift in response the first state of the bit.

In other alternate embodiments of the second aspect, the electronic device further includes a sensor to provide sensed information to the processing block, the processing block generating the data corresponding to the sensed information, or a power source to provide power to the sensor, the processing block and the channel disruptor. The power source can includes a power harvester for converting an external source into electrical power.

In a third aspect, the present disclosure provides a method for wireless communication of data from a device. The method includes transmitting a frame including a header and aggregated sub-frames in a wireless channel, the aggregated sub-frames being transmitted during a first period of time; performing channel estimation in response to information in the header of the frame; changing by the device, electrical characteristics of the wireless channel sequentially in time in accordance with an order of a number of data bits having first and second states during a second period of time overlapped by the first period of time, the electrical characteristics being changed in response to any bit having the first state; determining that a received sub-frame is undecodable due to the sub-frame being transmitted while the electrical characteristics of the channel is changed; and transmitting a status reply indicating which sub-frames are decodable and which sub-frames are undecodable based on the channel estimation, thereby representing logic states of the number of data bits.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for channel disruption based wireless communication.

Instead of directly transmitting data from an electronic device, such as a sensor, to a requesting device, the wireless channel of the wireless communication system is selectively disrupted or interfered with based on the logic states of the data to be transmitted by this electronic device. More specifically, a host device which can receive a message from such an electronic device broadcasts a query packet which includes a header and a series of sub-frames to be received by a receiving device. As each sub-frame is transmitted, the electronic device can selectively disrupt the wireless channel by changing its characteristics such that the receiving device can no longer decode that sub-frame. This wireless channel disruption occurs in response to a specific logic state of the bit of data to be transmitted by this electronic device. The receiving device then issues a status reply to the host device indicating which sub-frames are decodable and which sub-frames are undecodable. The host device then decodes this status reply information to extract the message of the electronic device.

Figure 1:
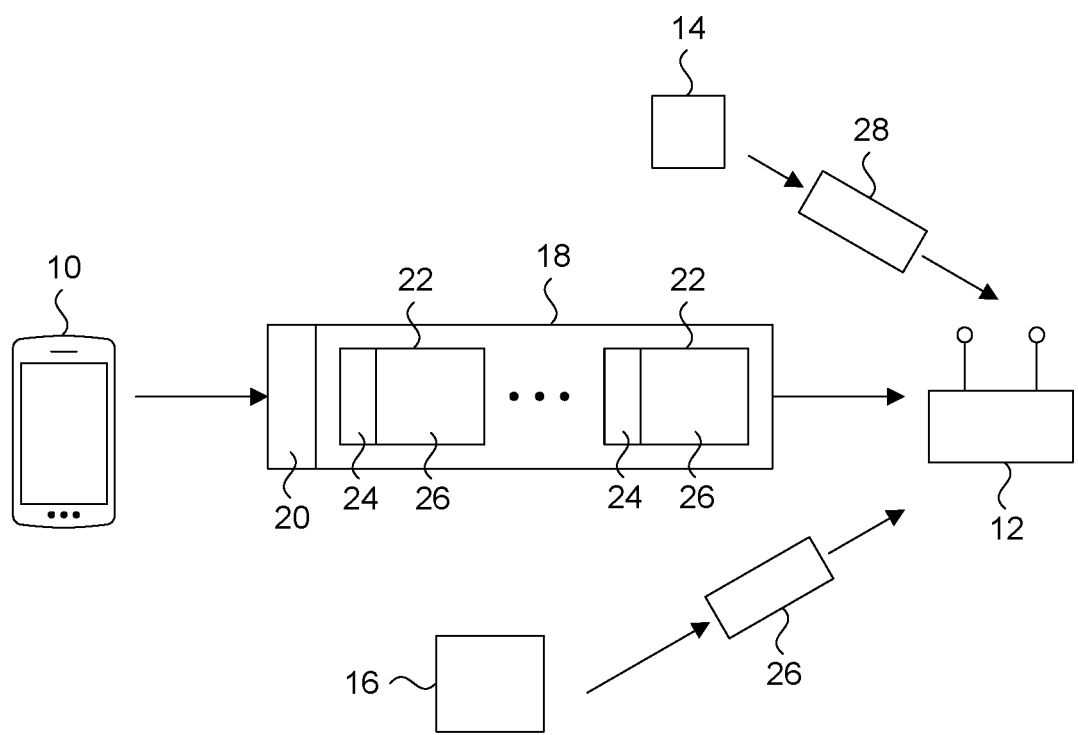
FIG. 1 shows an example wireless communication system which employs a frame aggregation mechanism to transmit data.

FIG. 1 shows an example wireless communication system which employs a frame aggregation mechanism to transmit data, within which the presently described embodiments operate in. Frame aggregation is the combining of any number of sub-frames to create a single larger frame to efficiently transmit data. FIG. 1 shows a host device 10, a receiving device 12 and WiFi transmitters 14 and 16. By example, the wireless communication system is a well-known WiFi system that complies with any current and future IEEE 802.11 standard that includes frame aggregation. Therefore the host device 10 can be any well-known mobile smart phone, tablet or any computing device which can run applications, and the receiving device 12 can be a wireless access point (AP).

A well-known WiFi packet 18 is shown in FIG. 1, which is a single frame that includes a header 20 followed by sub-frames 22. Each sub-frame 22 includes its own sub-frame header 24 and data payload 26. In a specific example, each sub-frame 22 can be a MAC Protocol DATA Unit (MPDU) and the aggregated frame 18 can be referred to as an A-MPDU. Thus in this specific example, header 20 is PHY header and sub-frame header 24 is a MAC header. As will be described later, the only header of relevance for the presently described embodiments is the frame header 20, regardless of the specific protocol or standard being used.

A simplified description of the communication protocol between the host device 10 and the receiving device 12 follows. When the host device 10 transmits a frame 18, the receiving device 12 receives the header first, which includes known training symbols. These known training symbols are used by the receiving device 12 to perform channel estimation. Since known symbols are transmitted over all OFDM sub-carriers, the receiving device 12 can estimate the phase and amplitude per subcarrier. This is known as Channel State Information (CSI).

Then, the receiving device 12 uses the estimated CSI to correct the received signal during the transmission of all the sub-frames 22 of the frame 18. This scheme is well known in the field of WiFi communications. The receiving device 12 then transmits a status reply, also known as a block acknowledgement (ACK) back to the mobile device 10. This block ACK indicates which sub-frames were successfully received and which were not. A successfully received sub-frame can be properly decoded while an unsuccessfully received sub-frame could not be decoded by the receiving device 12 using the estimated CSI.

In the example of FIG. 1, the WiFi transmitters 14 and 16 are also be configured to transmit frames 26 and 28, identical in configuration to frame 18. While WiFi transmitters 14 and 16 can be fully functional devices, such as a smart plug smart thermostat, they would be supplied with a reliable power supply. Simple sensor devices, on the other hand, would not have the capability to generate and/or transmit the previously described frames with any useful range.

Figure 2A:
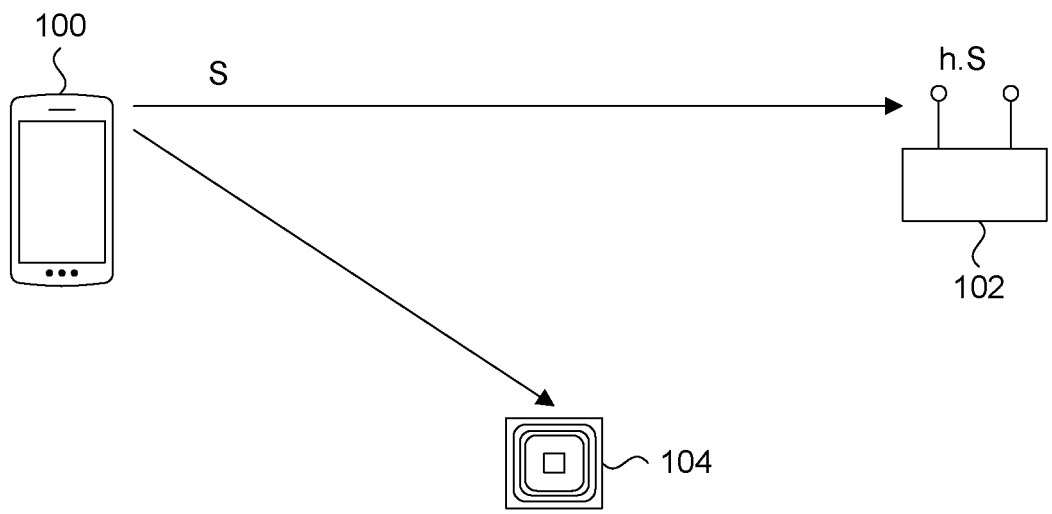
FIGS. 2A and 2B illustrates the principle operation of wireless channel disruption communication by an electronic device, according to a present embodiment.
Figure 2B:
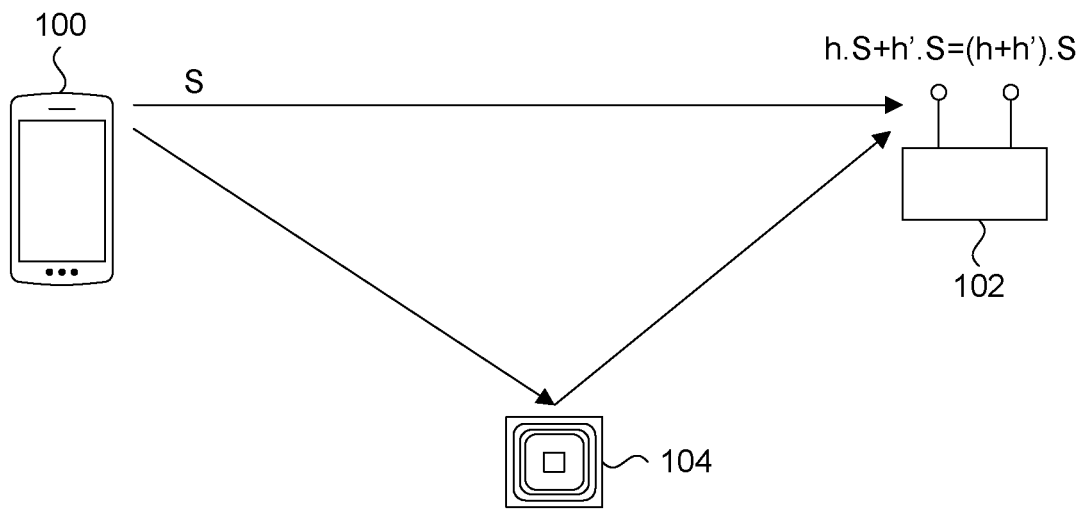

FIGS. 2A and 2B illustrates the principle operation of how an electronic device which does not necessarily have wireless transmit or receive functionality, such as a sensor by example, can transmit its data message to a host device that requests its data, according to a present embodiment.

In FIGS. 2A and 2B, it is assumed that the wireless communication system uses an aggregated frame for communicating data. The system includes a host device 100, a receiving device 102 and an electronic device 104. The host device 100 can be a wireless communication enabled mobile device such as a smart phone, tablet, access point, or computer, configured with an application to decode data communicated by the electronic device 104, via an acknowledgement reply sent by receiving device 102. The receiving device 102 can be a wireless access point or any other wireless communication device. In one example, the system of FIGS. 2A and 2B can be a WiFi communication system.

A wireless channel consists of direct and multiple indirect paths created by reflectors in an environment. Therefore, if the phase or amplitude of a signal reflected from one of these reflectors changes, then the wireless channel will change. Therefore in one embodiment, the electronic device of a present embodiment includes a channel disruptor to either change or not change at least one of the phase or amplitude of a transmitted signal in a sub-frame being transmitted by the host device 100. In one present embodiment, the channel disruptor is an antenna which can be switched between either of two modes. One mode is reflective and the other mode is non-reflective. The antenna is reflective when it is short circuited and non-reflective when it is open circuited.

Returning to FIGS. 2A and 2B, it is assumed that channel estimation has already been executed based on the header of the frame received by receiving device 102. In FIG. 2A, the host device 100 continues transmission of the frame by transmitting each sub-frame in sequence. The electronic device 104 channel disruptor is presently in a state where its channel disruptor is not reflecting a signal transmitted by host device 100. Accordingly, no change to the wireless channel results, and any sub-frame transmitted by the host device 100 is received and decodable by receiver 102. If the transmitted signal from the host device 100 is represented as S, then the received signal is h·S, where h is the wireless channel effect on signal S.

FIG. 2B illustrates a situation where the electronic device 104 is in a state where its channel disruptor is reflecting a signal transmitted by host device 100. Therefore, any sub-frame transmitted by the host device 100 is received and undecodable by receiver 102. In this case, h' represents the amount of wireless channel change created by electronic device 104. So, if the transmitted signal is S, then the signal received by receiving device 102 is now h·S+h'·S=(h+h')·S. In this situation, any sub-frame transmitted by mobile device 100 cannot be properly decoded by receiving device 102 as the channel characteristics have changed relative to what was assessed based on the previously received header of the frame. In other words, the channel estimation based on the header of the frame is no longer valid for the received sub-frame. The specific sub-frame transmitted at this time is recorded as not received or unsuccessfully received by the receiving device 102.

FIGS. 2A and 2B discusses one mechanism for disrupting the wireless channel, and other possible mechanisms for disrupting the wireless channel are discussed with reference to the block diagram of FIG. 3.

Figure 3:
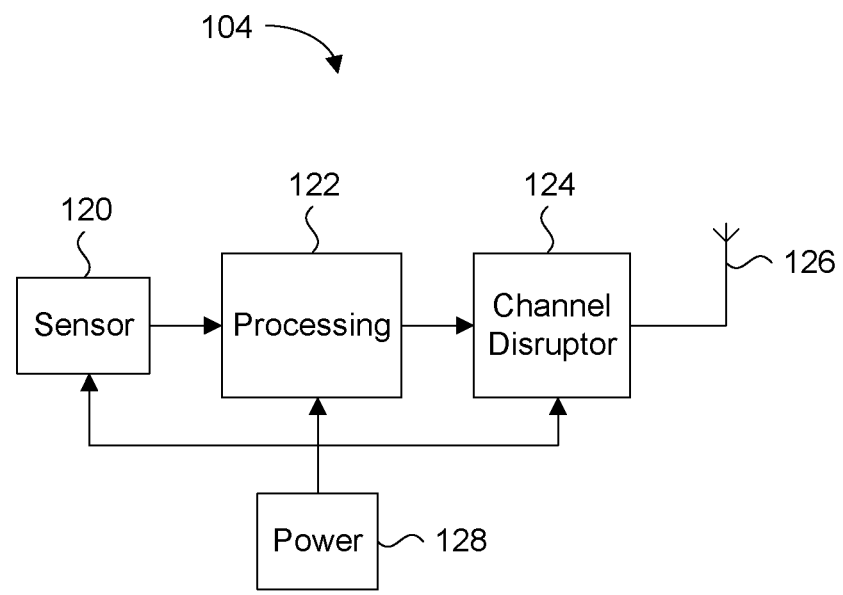
FIG. 3 is a block diagram of the electronic device with wireless channel disruption capability shown in FIGS. 2A and 2B, according to a present embodiment.

FIG. 3 is a block diagram of an electronic device, such as electronic device 104 shown in FIGS. 2A and 2B. In this present embodiment, electronic device 104 includes a sensor 120, a processing circuit 122, a channel disruptor 124, an antenna 126 and a power source 128. The electronic device 104 can include other blocks to execute additional functions if desired. The sensor 120 is configured for detecting any parameter and generating a sense signal, such as a current or voltage representing a level of the parameter to be sensed. This sense signal can be an analog signal provided to the processing circuit 122 for conversion into a corresponding digital value. Alternately, the sensor 120 can incorporate an analog to digital converter and a multibit sense signal is then sent to processing circuit 122. This multibit sense signal can be referred to as a message.

The processing circuit 122 may execute additional operations on the sense signal, before providing a final data message to channel disruptor 124. The processing circuit 122 is also responsible for synchronizing operations of the other components with a local clock, and includes a timer for waking up and activating the sensor 120 to query for the sense signal. It should be noted that the processing circuit has a predetermined period of operation, which may be known or unknown to the host device of the system, for communicating its data message. When the processing circuit 122 exits an inactive state, such as a sleep mode with minimum power consumption by example, and enters an active state, all components are activated and the data message is sent to channel disruptor 124. This data message is multibit and can be sent to the channel disruptor 124 as a sequence of bits having either a first state (logic "0") or a second state (logic "1"). Alternately, all bits of the data message can be sent in parallel to the channel disruptor 124.

The channel disruptor 124 is responsive to the bits of the data message received from the processing circuit 122 to control the antenna 126 to either disrupt or not disrupt the wireless channel. In the embodiment described in FIGS. 2A and 2B, it was described that the antenna can be reflective when it is short-circuited and non-reflective when it is open circuited. The channel disruptor 124 of FIG. 3 can include switching circuits to execute the short-circuiting and open circuiting of the antenna in response to a state of the data message bit to be transmitted. For example, if the present data message bit is a logic "0" then the channel disruptor 124 switches to be non-reflective. In contrast, if the present data message bit is a logic "1" then the channel disruptor 124 switches to be reflective to disrupt the wireless channel. Of course, the logic states can be reversed. Switching between these two states requires very little power.

In a first alternate embodiment of the channel disruptor 124, instead of switching the antenna 126 between reflecting and non-reflecting states, a phase of a reflected signal can be switched such that the signal is reflected with 0 degrees or 180 degrees. In this alternative embodiment, the channel disruptor 124 and antenna 126 are always set to reflect a signal being transmitted in the wireless channel. When the transmitted signal S from the host device is reflecting with 0 degree phase change, the resulting reflected signal received at the receiving device becomes $h \cdot S + h' \cdot S = (h+h') \cdot S$. It is noted this is the same expression describing the received signal in the previous embodiment described for FIG. 2B, but this is now the starting point for channel estimation when the frame is transmitted by the host device. In other words, the channel estimation executed by the receiving device is based on the characteristics of the training symbols in the header as modified by the 0 degree phase shift reflection by the channel disruptor 124 and antenna 126.

When the channel disruptor 124 and antenna 126 switch to 180 degree phase shift, the resulting received signal at the receiving device becomes $h \cdot S - h' \cdot S = (h-h') \cdot S$. When the channel disruptor 124 and antenna 126 is reflecting with 0 degree phase shift, the wireless channel changes by $+h'$. When the channel disruptor 124 and antenna 126 is reflecting with 180 degree phase shift, the wireless channel changes by $-h'$. Therefore, the wireless channel change between these two modes will be $2h'$. This is an increased level of change over the previous embodiment described where the amount of wireless channel change was only $h'$. Advantages of this alternate embodiment is reduced bit error rate (BER) and increased range of the electronic device 104. In an alternate configuration, the channel disruptor 124 and antenna 126 are always set to reflect a signal being transmitted in the wireless channel with 180 degree phase shift, and switches to 0 degree phase shift reflection for disrupting the wireless channel.

The configuration of the channel disruptor 124 in this alternate embodiment is to connect two short-circuited conductive lines with different lengths to the output of an RF switch which is itself connected to the antenna 126. The difference between the length of the lines is a quarter of wavelength and therefore they create a 180 degree phase difference. It should also be noted that the channel disruptor 124 can be integrated with the processing circuit 122. Switching between 0 and 180 degree phase shift modes requires very little power.

The previously described mechanisms for disrupting the wireless channel are examples of passive interference techniques and do not require significant amounts of power. Therefore, power source 128 can be a power harvesting unit which transforms other forms of energy into electrical energy to power the sensor 120, processing circuit 122, and channel disruptor 124. Therefore, other low-power passive interference techniques can be employed provided they disrupt the wireless channel characteristics to a point that the data transmitted at that time by a host device can no longer be decoded.

By example, the processing circuit 122 such as a micro controller, the sensor such as a light and temperature sensors, and the channel disruptor including an RF switch consumes 540, 726, 1089 and 9 micro Watts respectively. Experiments have shown that a small 2×3 cm solar panel can generate sufficient power to enable it to operate.

In yet a further alternate embodiment, active interference can be used to achieve the same effect. By example, channel disruptor 124 can be configured to generate an oscillating signal that interferes/corrupts data being transmitted at that time by a host device. Here the channel disruptor 124 can include an oscillator. By example, a sine wave can be generated by the channel disruptor 124 operating at a target frequency of the wireless system with a wide channel width. The amplitude of the sine wave can be tailored depending on the operating range for channel disruption that is desired. This type of wireless channel disruption is known in the art. Such an embodiment will further improve the range and robustness of sub-frame corruption. The power source 128 for such an embodiment can be a battery or power harvesting unit. The above-described passive and active techniques for disrupting the wireless channel are not intended to be exhaustive, and is intended that any electronic mechanism for disrupting the wireless channel to render a subframe undecodable can be employed.

Figure 4:
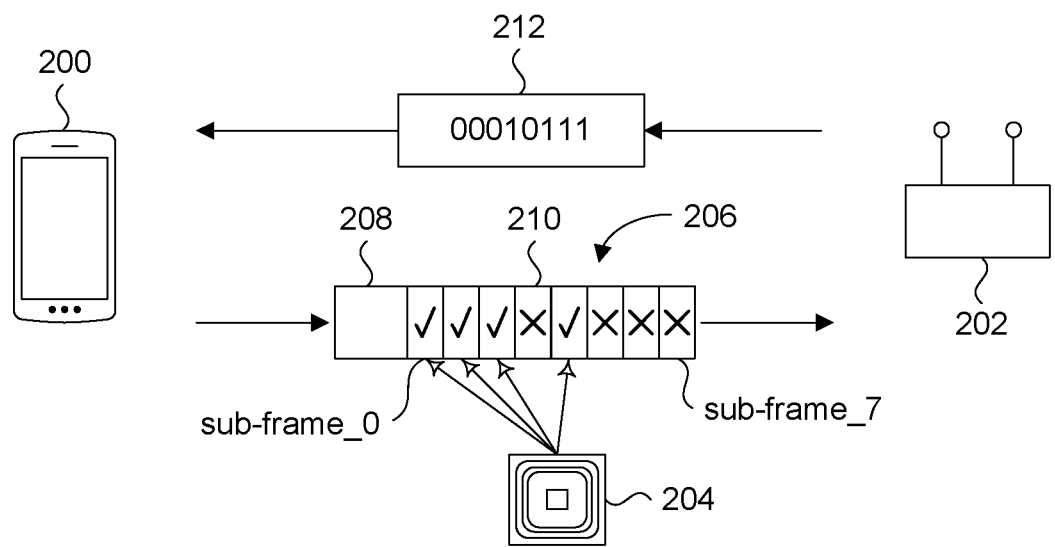
FIG. 4 is an illustration of an example wireless channel disruption communication operation, according to a present embodiment.

Now that the principles of how a wireless channel in a wireless communication system that uses frame aggregation to transmit data has been described, reference is now made to FIG. 4 to describe how a data message from an electronic device is communicated and received by a host device.

In the embodiment shown in FIG. 4, a host device 200, a receiving device 202 and an electronic device 204, are the same as elements 100, 102 and 104 previously shown and described for FIGS. 2A and 2B. In this embodiment, the host device 200 issues a query packet frame 206, which includes a header 208 followed in sequence by, in this example, 8 sub-frames 210, of which only one is annotated. The individual headers of the sub-frames 210 are not shown. The host device 200 issues the query packet 206 with the intent to receive or pick up a message from electronic device 204, which in this example could be a temperature sensor. The header 208 is used by the receiving device 202 to perform channel estimation and internal configuration to decode data of the subsequent sub-frames 210 based on the CSI. As each sub-frame 210 is transmitted by the host device 200, the electronic device 204 selectively disrupts the wireless channel based on its sequence of bits that make up its data message. Therefore, each bit of the data message corresponds to one sub-frame 210, and this is how the electronic device 204 communicates its data message.

In the example of FIG. 4, eight sub-frames 210 are transmitted as part of the query packet frame 206, and the data message from the electronic device 204 is eight bits in length and represents a temperature of 23° C. (i.e., 00010111). The first sub-frame 210 to be transmitted is sub-frame_0 appearing just to the right of header 208, and the last sub-frame 210 to be transmitted is sub-frame_7 appearing at the rightmost side of query packet frame 206. As shown in FIG. 4, the wireless channel at the time sub-frame_0, sub-frame_1, sub-frame_2 and sub-frame_4 are transmitted and not disrupted by electronic device 204. In contrast, the wireless channel at the time sub-frame_3, sub-frame_5, sub-frame_6 and sub-frame_7 are transmitted and are disrupted by electronic device 204.

Upon receiving all of the sub-frames 210, the receiving device 202 determines which of the sub-frames could be decoded based on the applied CSI and those which could not be decoded based on the applied CSI. The receiving device 202 then issues a status reply 212 back to the host device 200 indicating which sub-frame positions were not decodable by way of a logic "1" and which frame positions were decodable by way of a logic "0". The resulting string of the status reply is "00010111", which the host device 200 can decode into the 23° C. value of the message by electronic device 204. In FIG. 4, each logic "0" of the status reply 212 corresponds to a sub-frame 210 which has not been disrupted, as shown with a checkmark icon. In contrast, each logic "1" of the status reply 212 corresponds to a sub-frame 210 which has been disrupted, as shown with an "X" icon. Therefore, the electronic device 204 has communicated its data message the host device 200. The logic states can be inverted such that each logic "0" corresponds to a disrupted sub-frame 210 and each logic "1" corresponds to a non-disrupted sub-frame 210.

In the presently described embodiment, the data message provided by the electronic device 204 has a string of bits which can be ordered from least significant bit to most significant bit where the first bit communicated is the least significant bit. In alternate embodiments this ordering can be reversed or even scrambled in a known manner that is decodable by the host device 200. Such scrambling can be controlled by the processing circuit 122, and provides a level of security or encryption.

It is clarified at this point for the present embodiments that the electronic device 204 never directly transmits its data message to the host device 200 or to the receiving device 202, as it does not have any wireless data signal transmission circuitry. Instead, the data message is "piggybacked" onto an actual wireless data signal transmitted by the host device.

It should be pointed out that neither the host device 200 nor the receiving device 202 makes any specific request for information from electronic device 204. The electronic device 204 may not even have a wireless receiver. Instead, the electronic device 204 operates independently of the host device 200 and the receiving device 202. More specifically, the electronic device 204 will begin disrupting the channel based on its data message starting at predetermined times and for a preset duration of time, after which the channel disruptor 124 goes inactive. In other embodiments the entire electronic device 204 can become inactive and remain in a sleep mode of operation to consume a minimal amount of power while maintaining critical operations, such as running the internal clock by example. Therefore, the host device 200 is configured to issue its query packet frame 206 at about the same time that the electronic device 204 becomes active to start its selective channel disruption activities.

To do this, the host device 200 requires information about the first time the electronic device 204 is active to start wireless channel disruption, referred to simply as the start time, and the period of operation of the electronic device 204. Furthermore, it is likely that the internal clock of the electronic device will drift, thereby shifting its start time and possibly miss-aligning its timing for channel disruption with the sub-frame it is intended to disrupt. Another factor to take into account is the random nature of channel access by the host device, which makes it impossible to know exactly when the query packet frame must be generated so that it is transmitted over the air at its intended time. This is because the query packet frame experiences random delays due to channel access time and other processes that are beyond the control of the host device 200.

One technique for doing this is to synchronize a query packet frame with the data message of the electronic device by having the electronic device detect the query packet frame from other packets. This can be done by transmitting a specific, known bit pattern in the payload of the first few sub-frames of a packet to indicate that the packet is a query packet. These first few sub-frames can be referred to as trigger sub-frames. This then distinguishes query packet frames from packets being transmitted by other devices operating within the same wireless system, and enables the electronic device to measure the sub-frame lengths. The electronic device then uses an energy detector and a comparator to detect the trigger sub-frames at the beginning of the query packet frame and also to determine the timing between two consecutive sub-frames.

This embodiment provides dynamic synchronization between the timing of the query packet frame and that of the channel disrupting by the electronic device, which is suitable in applications where power consumption by an energy detector in the electronic device is not an issue, as such an energy detector with enough sensitivity to detect certain types of wireless packets can be as high as 90 mW. A different solution is available which can be used in applications where the electronic device does not have access to large amounts of power.

According to the present embodiments, the following configurations are employed to address the electronic device clock drift and the host device quasi-random query packet frame transmission time. Later will be a description of how the start time and the period of operation of the electronic device are discovered. The presently discussed embodiments maximize the probability that the sub-frames of a query packet frame overlap completely with the duration of time an electronic device is communicating its entire data message.

In the present embodiment, a query packet frame is configured to be at least double the length of the data message from the electronic device. In one example, the number of sub-frames in the query packet frame is set to be 2 times the number of bits of the data message. Therefore, even if imperfect alignment in timing occurs between the transmission start time of the first sub-frame of the query packet frame and that of the electronic device start time, there is a higher likelihood of an overlap in the duration of time that the query packet frame is being transmitted with the entirety of the duration of time the electronic device is disrupting the wireless channel for communicating its data message.

Then, instead of having the host device transmit a single query packet frame in order to collect the message of the electronic device, multiple query packet frames are transmitted in succession by the host device. By example, the host device is configured to transmit five query packet frames in sequence back to back with no gap between successive query packet frames. This takes into account the random nature of channel access delay which can occur and introduce delays between successive query packet frames. This configuration increases the probability of complete overlap of one query packet frame with the duration of time the electronic device is disrupting the wireless channel for communicating its data message.

In a further embodiment, the electronic device is configured to disrupt the wireless channel to communicate and repeat its data message multiple times in succession between successive data messaging periods. By example, the electronic device can repeat its data message four times in succession with no timing gap in between data messages being communicated. In conjunction with the multiple query packet frames transmitted by the host device, an even higher probability of obtaining complete overlap of one query packet frame with the duration of time the electronic device is disrupting the wireless channel for communicating its data message is obtained.

The above noted example schemes for transmitting multiple query packet frames by the host device and for communicating multiple messages in sequence by the electronic device can now be leveraged to establish the period and the start time of the electronic device.

Figure 5:
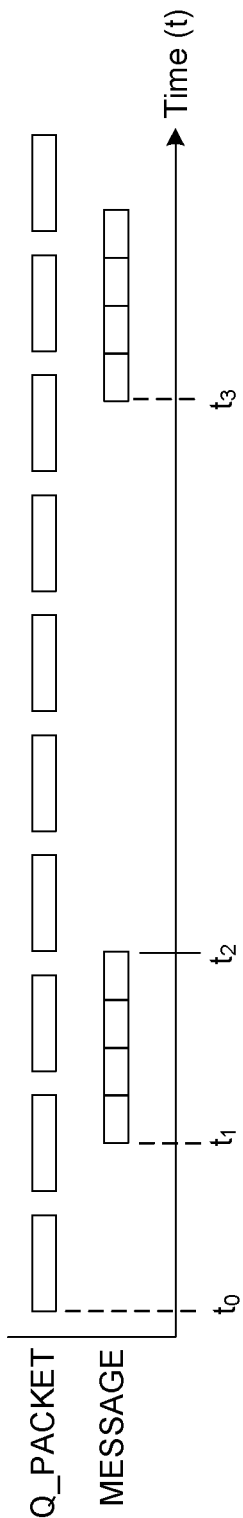
FIG. 5 is a timing diagram of a host device operating in an initialization phase, according to a present embodiment.

FIG. 5 is a timing diagram showing an embodiment of period and electronic device start time determination by the host device.

Each of the Q_PACKET boxes shown in FIG. 5 represents a query packet frame transmission time duration which includes a header and a predetermined number of sub-frames as previously discussed in FIG. 1. Each of the MESSAGE boxes shown in FIG. 5 represents a duration of time that the electronic device is selectively disrupting the wireless channel when it becomes active and starts communicating its data message. In FIG. 5, the successive Q_PACKET boxes are spaced from each other in time to help illustrate the possible timing gaps that are introduced by the system, and the gaps are not shown to scale and can have any duration of time. On the other hand, the electronic device operates independently of the wireless communication system and therefore there are no timing delays between successive MESSAGE boxes that are being repeated.

In this proposed technique according to a present embodiment, an initialization phase is executed by the host device when it is powered on and connects to the wireless system, or when it enters the range of the wireless system and connects to the wireless system. During this initialization phase, the start time for the electronic device to begin channel disruption and its period of operation are discovered.

Starting at time $t_0$, the host device sends back to back query packet frames Q_PACKET. At some unknown time $t_1$ after $t_0$ the electronic device becomes active and begins channel disruption based on the data message to communicate. The data message is repeated four times by the electronic device in the present embodiment, where wireless channel disruption by the last bit of the fourth message ends at time $t_2$.

It should be recalled that every query packet frame Q_PACKET received by the receiving device results in a status reply back to the host device. By example, the first Q_PACKET at time $t_0$ is not subjected to any wireless channel disruption as the electronic device is inactive. Therefore, none of its sub-frames are disrupted and the status reply will show that all sub-frames are decodable. The host device is configured to decode this information in the status reply to mean that the electronic device is inactive during transmission of the first Q_PACKET.

In the present embodiments, each MESSAGE can start with a known common preamble to identify it as a valid message being communicated by an electronic device. If at time $t_1$ the preamble is detected by the host device in the status reply, then the host device has identified the start time when the electronic device begins communicating its data message. This is because the host device can timestamp when each sub-frame is transmitted, and the status reply indicating which sub-frame has been deemed undecodable is used to retroactively determine when the first bit of the data message is being communicated by the electronic device. After time $t_2$, the electronic device becomes inactive and communication of its data message terminates for this period.

After time $t_2$ the electronic device becomes active again at time $t_3$ and begins transmitting another data message. The preamble is detected again, and the period of the electronic device can easily be determined as $t_1$ is already known.

In the presently shown example of FIG. 5, start times $t_1$ and $t_3$ occur at the first data message of the four repeated data messages in each set. It is possible that start times $t_1$ or $t_3$ have been determined by the host device to be at different data message positions in their respective sets. In this situation, the calculated period for the electronic device differs from the actual period of operation for the electronic device. This does not impact the normal operating mode of the host device as the configuration whereby multiple query packet frames are transmitted and multiple data messages are repeated back to back compensates for this difference. As will be discussed later, another technique is employed to correct for this difference.

Therefore, having the information of $t_0$ and $t_1$ allows the host device to adjust the timing of the transmission of its first query packet frame to maximize the probability that all of its sub-frames overlap the duration of time the data message is being communicated by the electronic device during a normal operating phase. It should be noted this timing takes into account the header of the query packet frame which ensures that the header of the query packet frame is transmitted before the electronic device begins communicating its data message. Having the timing difference between $t_3$ and $t_1$ enables the host device to set the interval for transmitting the next set of query packet frames during a normal operating phase. This initialization process starts over when a disruption in the system and/or the host device occurs during this initialization process.

Now a normal operating phase for the wireless system can commence for the host device, however the electronic device does not know the difference between an initialization phase and the normal operating phase as its only task is to become active at the predetermined time to communicate its data message.

During the normal operating phase, the host device can transmit multiple query packet frames in quick succession, such as five frames by example. At approximately some time later, the electronic device begins communication of its data message by wireless channel disruption, which is repeated multiple times, such as four data messages by example.

Because the host device knows the start time and period of operation of the electronic device as discovered during the initialization phase, according to a present embodiment, the host device is configured to always begin transmitting its first of multiple back to back query packet frames some predetermined time before the discovered start time of the electronic device. By example, statistical analysis of a typical WiFi system shows a delay between 10-30 milliseconds between the host device intending to transmit its first query packet frame and actual transmission on the wireless channel. Therefore the host device can always set its intended transmission time for its first query packet frame 30 milliseconds before the discovered start time of the electronic device. This predetermined shift can be set based on the characteristics of the specific wireless system being employed.

Figure 6A:
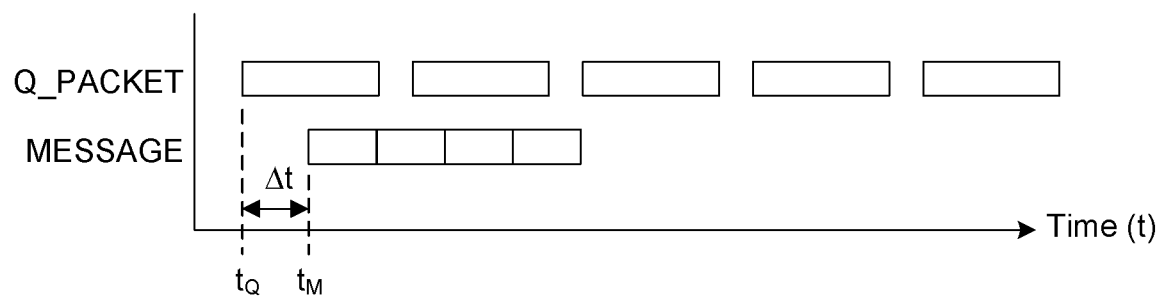
FIG. 6A and FIG. 6B are timing diagrams showing dynamic synchronization, according to a present embodiment.

An example of this is shown in FIG. 6A, where the host device is in the normal operating phase. The spacing between consecutive query packet frames represents the possible timing gap introduced by the system. Here the start time of the electronic device determined from the initialization phase is $t_M$. Based on the delay characteristics of the wireless system, the host device can apply in advanced shift in timing of $\Delta t$ so that the first query packet frame is set for transmission at time $t_Q$.

As previously mentioned, the electronic device internal clock may drift during the normal operating phase, and therefore it will start wireless channel disruption communication of its data message at a time that deviates from the discovered start time. This means that the original discovered period of operation of the electronic device can shift, even if it was properly determined to substantially match the actual period of operation from the initialization phase. In cases where this type of clock drift occurs and/or a mismatched determination of the period of operation was previously made during the initialization phase, the previously discussed technique of using time stamped sub-frames detecting a preamble of a data message can be used to dynamically readjust $t_M$ and thereby to readjust $t_Q$.

Fortunately, because multiple query packet frames are transmitted and the electronic device repeats its data message multiple times, there is a high probability that one query packet frame will completely overlap the duration of time the electronic device is communicating one of its data messages.

Figure 6B:
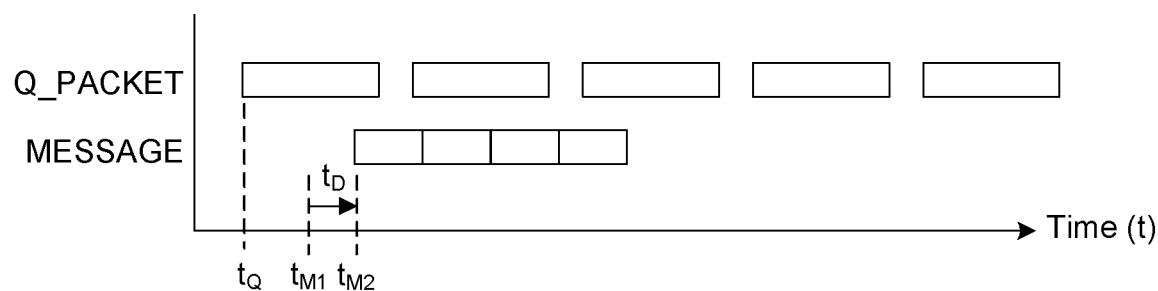

This process can be referred to as coarse dynamic synchronization correction, which can occur after every set of query packet frames are transmitted to obtain one data message from the electronic device. In some embodiments, thresholds can be set to execute dynamic synchronization correction. FIG. 6B shows an example where the actual start time of the electronic device is $t_{M2}$, which differs from the discovered start time of $t_{M1}$. In this example situation, there is no complete overlap of the query packet frame with the first data message. The host device can calculate the delay between $t_{M2}$ and $t_{M1}$ as being delay $t_D$ since the host device can determine the time $t_{M2}$ where the preamble appears in a sub-frame. Accordingly, if the delay $t_D$ exceeds some predetermined time, then the host device can shift forward its transmission start time $t_Q$ by the time value of delay $t_D$.

Alternately, such thresholds can be set when it is determined that the first query packet frame no longer fully overlaps with the first data message communicated by the electronic device, or is close to losing full overlap by one or two sub-frames.

While synchronization of the query packet frame to the electronic device data message communication time can be achieved, the transmission of a sub-frame of a query packet frame should be synchronized with the wireless channel disruption timing.

Figure 7:
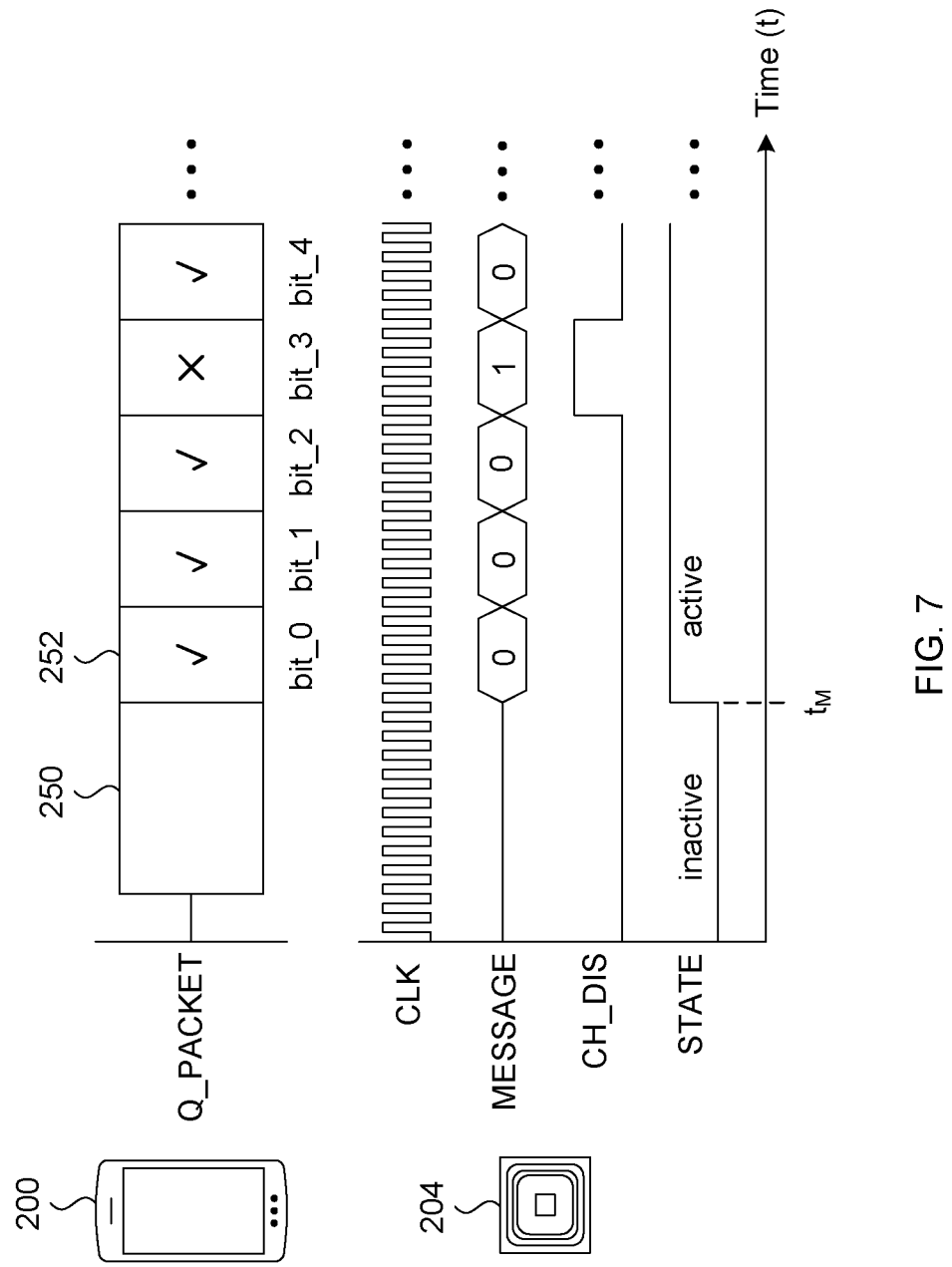
FIG. 7 is a timing diagram showing sub-frame to data message bit synchronization, according to a present embodiment.

FIG. 7 is a timing diagram showing one embodiment of sub-frame to data message bit synchronization. The bottom timing diagram shows signal traces for the electronic device 204, which includes the internal clock CLK, the data message MESSAGE, a channel disruption signal CH_DIS, and a state of the electronic device STATE. The signal traces are not shown to scale, and are intended to illustrate the general sequence and timing of signals relative to one another. The top timing diagram shows relative timing of the query packet frame Q_PACKET frame header 250 and the following sub-frames 252 to signals of the electronic device 204. Only one sub-frame 252 is labelled to simplify the drawing and only five sub-frames are shown.

At time $t_M$, the electronic device 204 becomes active and begins communicating its data message. Meanwhile operating independently, the host device 200 has transmitted its query frame packet on the wireless channel with a timing as previously described such that its header 250 is completely transmitted before $t_M$. In the presently shown example of FIG. 7, the first three bits of the data message are a logic "0", indicating that no wireless channel disruption is required. Referring to the embodiment of FIG. 3 by example, the processing circuit 122 can toggle the switching signal CH_DIS of FIG. 7, to an active state or an inactive state to control the channel disruptor 124. Accordingly, the corresponding sub-frames 252 are decodable by the receiving device (not shown) and therefore shown with a check mark. These sub-frames are annotated as bit_0, bit_1, and bit_2.

However the fourth bit of the data message is a logic "1" and the switching signal CH_DIS of FIG. 7 is toggled to the active state to control the channel disruptor to switch to a state to disrupt the wireless channel. As a result of the channel disruption while the sub-frame 252 (bit_3) is transmitted by host device 200, that sub-frame is rendered undecodable by the receiving device, and is marked with an "X" mark. The following bit of the data message is a logic "0" and the CH_DIS signal is toggled to the inactive state and no wireless channel disruption occurs. Therefore, the sub-frame 252 corresponding to bit_4 of the data message is decodable by the receiving device.

After all sub-frames 252 have been transmitted by the host device, the receiving device generates a status reply for the host device 200 indicating which sub-frames were decodable and undecodable. As shown in the previous example of FIG. 4, a string of bits are included in the status reply with logic states corresponding to the decodable or undecodable state of the corresponding sub-frame. Then the host device 200 decodes the status reply to extract the data message communicated by the electronic device 204, which can be further transmitted to other systems that may require this information as input for other processes and/or transmitted to a user device such as a mobile smartphone, tablet or computer to inform a user through a graphical interface. Because the host device 200 knows the length of the data message, any status reply it receives that does not include the entire data message is deemed an unsuccessful communication of the data message in that corresponding query packet frame. The data message can include a CRC and/or parity bits or other error correction and/or encryption techniques to assist in error detection and correction of the data message and ensuring the message cannot be read by devices other than the host device 200.

The embodiment of FIG. 7 illustrates a situation where almost perfect synchronization at the sub-frame level to the timing of the wireless channel disruption start time and duration by the electronic device occurs. There may be instances where some minor timing deviation at the host device occurs, which results in some misalignment. In a worst case scenario, the alignment is of a magnitude that the electronic device begins disrupting the wireless channel mid-way during transmission of a first sub-frame, and does not end until mid-way into transmission of the next sub-frame. This can have the effect of rendering both sub-frames undecodable by the receiving device, and therefore a status reply with an erroneous data message.

Figure 8:
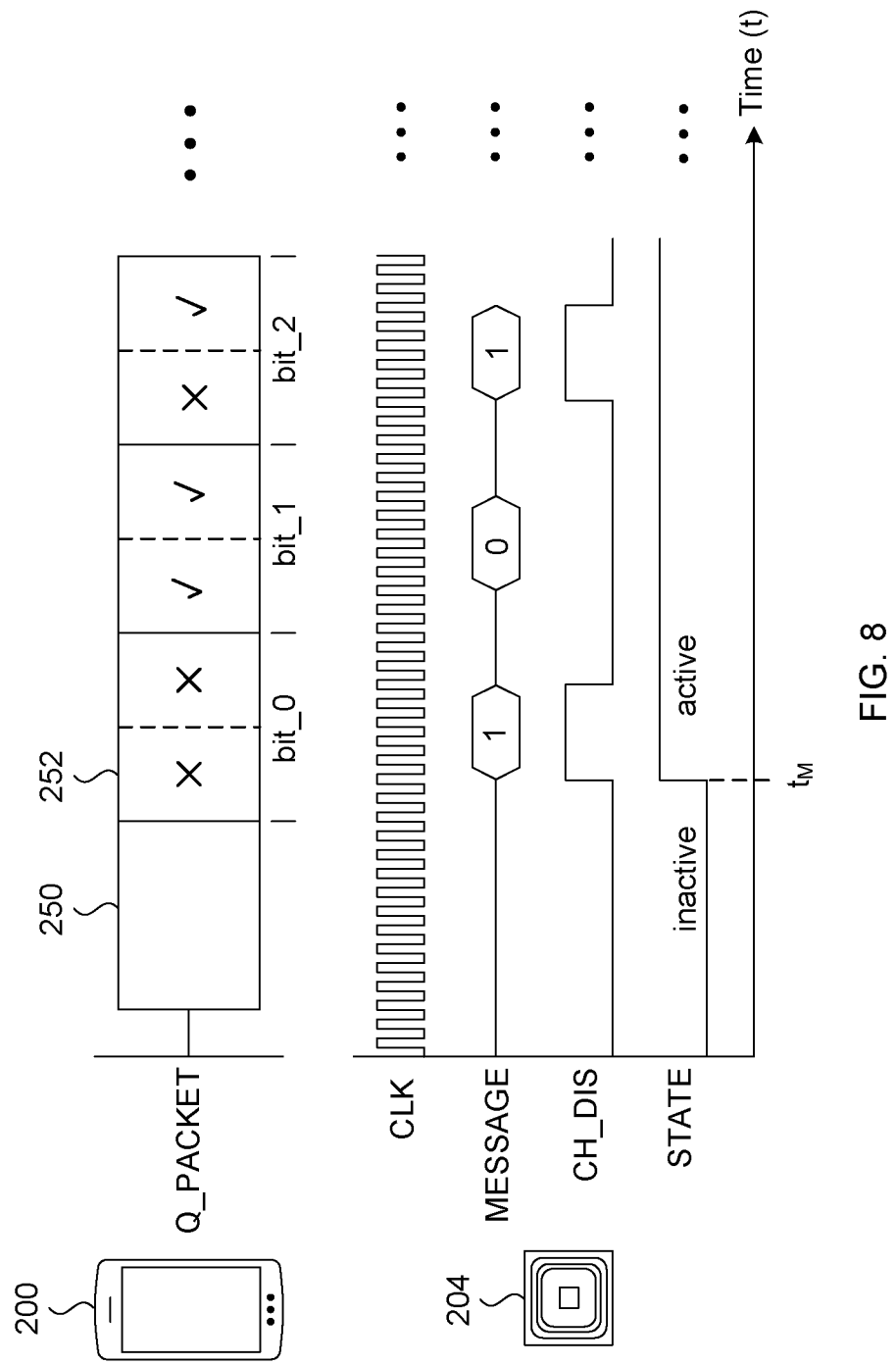
FIG. 8 is a timing diagram of a redundancy method, according to a present embodiment.
Figure 9:
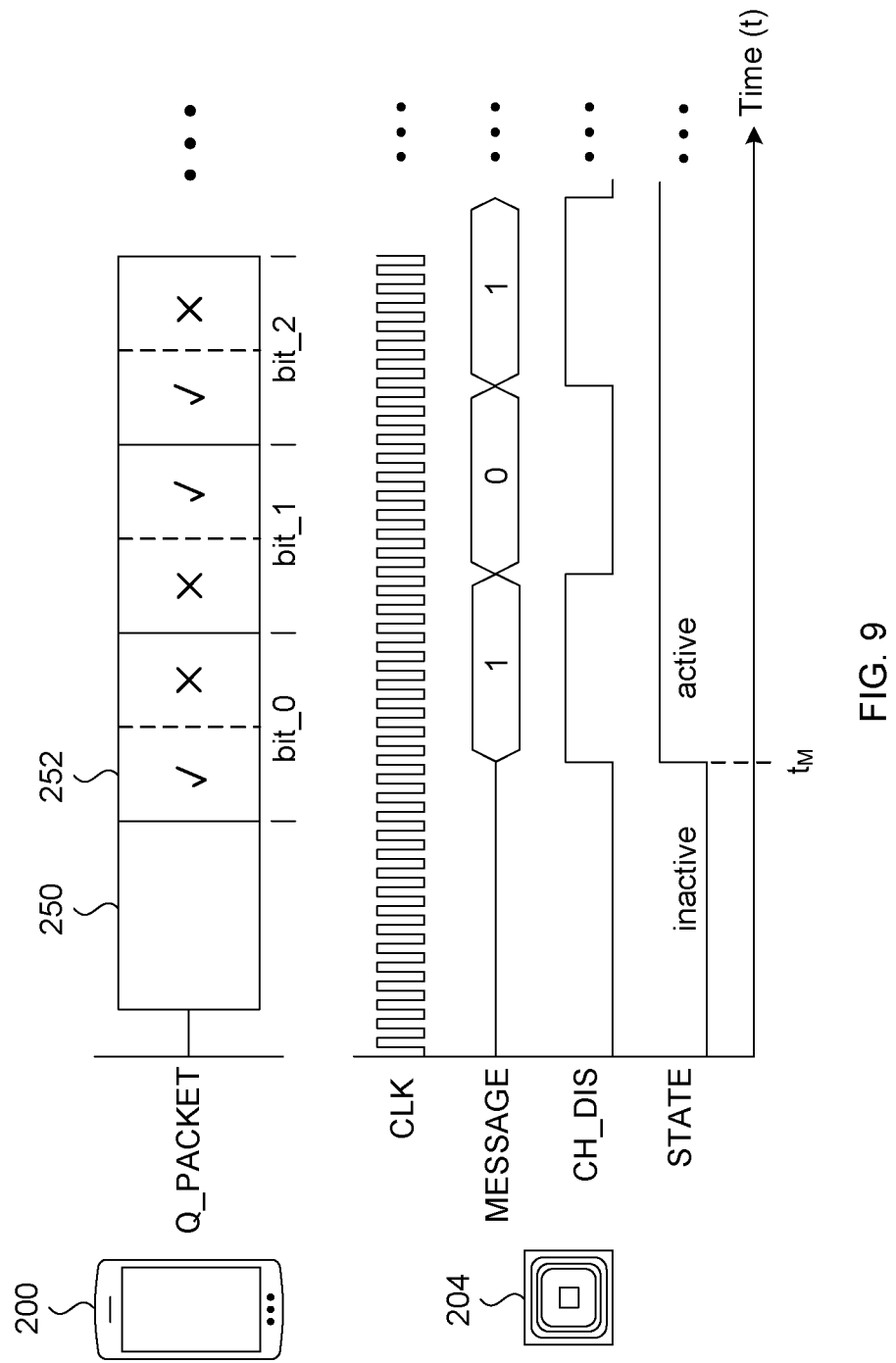
FIG. 9 is a timing diagram of a redundancy method, according to an alternate embodiment; and, FIG. 10 is a flow chart of a method of operating a wireless system with wireless channel disruption, according to a present embodiment.

This problem is addressed by the embodiments illustrated in FIG. 8 and FIG. 9.

FIG. 8 shows timing diagrams similar to that shown in FIG. 7, with the same signal labels being used. It is assumed that the durations of the header 250 and 252 are the same as shown in FIG. 7. In this present embodiment however, two sub-frames 252 are designated for representing a single bit of the data message MESSAGE. FIG. 8 has been annotated to show how every two adjacent or consecutive sub-frames 252 after the header 250 are designated for one bit of the data message. Also, the electronic device 204 in this present embodiment is configured to communicate a bit of its data message for the duration of time of one sub-frame 252, as in the embodiment of FIG. 7, except now there is a delay of the same duration before the next bit is communicated.

In this configuration, one or both of the host device 200 and electronic device 204 timing can deviate slightly, but as long as the wireless channel disruption for the single bit of the data message occurs within the timing boundary of the two consecutive sub-frames 252, then at least one of the sub-frames 252 will be disrupted. This is clearly illustrated in FIG. 8 where the first data message bit after the electronic device 204 becomes active is a logic "1", indicating that wireless channel disruption is to occur. Because time $t_M$ occurs midway into the first sub-frame 252, the channel disruption starts midway during transmission of this first sub-frame 252 and ends midway into the next sub-frame 252. In this example both sub-frames 252 are disrupted and bit_0 is clearly defined. The next bit of the data message is a logic "0" and no channel disruption occurs, and bit_1 is clearly defined. The third bit of the data message is a logic "1", and this example shows how just the left side sub-frame is disrupted while the right side sub-frame is not.

As before, the receiving device attempts to decode all sub-frames and sends its status reply to the host device 200 indicating which sub-frames are decodable and which are undecodable. With this particular configuration, the host device 200 is programmed to decode each pair of status reply bits based on the presence of at least one undecodable sub-frame. Therefore, the additional sub-frame provides redundancy in the event there is a shift in timing between the electronic device and the transmission time of the host device 200.

FIG. 9 presents an alternate redundancy embodiment to the one shown in FIG. 8. FIG. 9 shows timing diagrams similar to that shown in FIG. 7, with the same signal labels being used. It is assumed that the durations of the header 250 and 252 are the same as shown in FIG. 7, and two sub-frames 252 are designated for representing a single bit of the data message MESSAGE as in the embodiment of FIG. 8. FIG. 9 has been annotated to show how every two adjacent or consecutive sub-frames 252 after the header 250 are designated for one bit of the data message. This alternate embodiment differs from that of FIG. 8 in that the duration of time the electronic device is disrupting the wireless channel is the same as the duration of time required by the host device 200 to transmit two consecutive sub-frames 252. Furthermore, there is no delay in the time when the next data bit of the message is to be communicated.

FIG. 9 shows a situation where a shift in timing has occurred between transmission of the query packet frame and the start time $t_M$. It can be seen that the first sub-frame 252 is not disrupted but the second sub-frame is disrupted. Therefore, at least one sub-frame of the pair representing bit_0 has been disrupted. However, it is possible that the third sub-frame 252 belonging to bit_1 is disrupted. The fourth sub-frame is not disrupted because the bit of the data message has switched to a logic "0". It can be seen that this shift relative to $t_M$ can result in a spill-over effect where the wireless channel disruption intended for one pair of sub-frames affects the sub-frame representing another bit.

In such a situation, the host device 200 is programmed to read only the left side or right side sub-frame of each pair for all the sub-frames of the query packet frame. The right side or left side sub-frame selection is determined by identifying the first pair of sub-frames 252 where a first occurrence of an undecodable left side or right side sub-frame is reported in the status reply. If the undecodable sub-frame is on the right side, then the timing shift is uniform and all the right side sub-frames will carry the correct and intended communicated bits of the data message MESSAGE. Conversely, if the first occurrence of the undecodable sub-frame is on the left side, then all the left side sub-frames will carry the correct bits of the data message. This differs from the embodiment of FIG. 8 where an OR function executed on the pair of status reply bits can determine the final data message bit state. In the example in FIG. 9 the right side properly encodes the intended message.

In the previously described embodiments, it is assumed there is one electronic device operating in the system. In alternate embodiments, there can be any number of wireless devices in the system, each of which will communicate its own data message to be picked up by query packet frames issued by the host device. In such an embodiment, each electronic device can be preassigned a unique identification number via hard coding, or programmed with a unique identification number. By example, the electronic device can be configured to have a plug-in port, such as a USB port, which can be plugged into a computer to register it with the host application and for assignment of a unique identification number. This unique identification number is communicated by the electronic device each time it communicates its data message, and can follow the previously described preamble before communicating the bits of the data message.

According to an alternate embodiment, in addition to programming of a unique identification number while plugged into the USB port, electronic device can be configured to change other operational parameters. Such operational parameters can include the start time for the electronic device since the start time for other electronic devices may already be known. Another operational parameter can be the period of operation to minimize possible conflicts with other electronic devices. Another operational parameter can be the duration of time the electronic device is selectively disrupting the wireless channel, as shown by the embodiments of FIG. 8 and FIG. 9. Similarly, the delay for communication of the next bit of the message can be configured as well.

This provides flexibility for the system as different electronic devices operating in the same system can have different programmed operational parameters. With this known information, the host device can issue a query packet frame with multiple sub-frames representing a single bit of information or a query packet frame with a single sub-frame representing a single bit of information depending on which electronic device a message is to be picked up from. Then the host device can appropriately decode the status reply.

Therefore, multiple electronic devices can be used within environment, such as a smart home with multiple electronic devices that monitor various types of parameters. With the unique identification numbers, the host device can distinguish data messages communicated by the different electronic devices. It is noted that each electronic device may start at a random time, therefore it is unlikely that to electronic devices will have the same start time for disrupting the channel. The probability of 2 electronic devices overlapping in the duration of time they are disrupting the channel decreases as the period of the electronic devices increases. For example, the period can be every 1 minute or 10 minutes.

In the previously described embodiments, the host device transmits the query packet frame to pick up the communicated message from the electronic device. In an alternate embodiment, the receiving device which can be a wireless access point for WiFi by example, can transmit the query packet frame. Then the host device becomes the receiving device which sends a status reply back to the receiving device.

Figure 10:
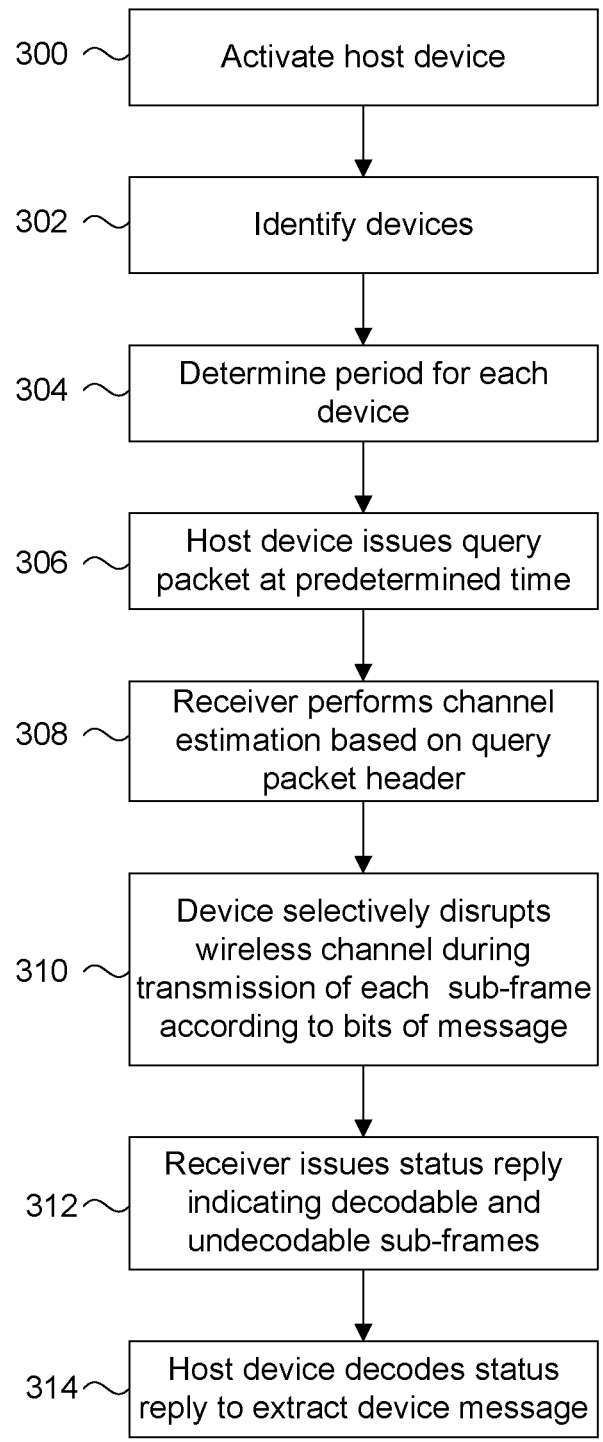

A summary of the operation of the previously described wireless system is described with reference to the flow chart of FIG. 10. It is assumed that the wireless system is one which uses frame aggregation as described in FIG. 1 and at least one electronic device as described in FIG. 3 is installed within range of the wireless signals of the system. The presently described method embodiment begins by activation of the host device at 300, which is presumed to have installed upon it the necessary application for decoding a status reply from the receiving device to extract the data message communicated by the electronic device. It is further assumed that the host device and the electronic devices are configured with the dynamic synchronization embodiment and optionally one of the redundancy embodiments.

The host device then begins an initialization phase at 302 to identify the electronic device(s) by identification number. The period and start time of each electronic device is further determined at 304. Steps 302 and 304 can occur concurrently. Once all electronic devices have been initialized, as per the discussion in relation to the embodiment of FIG. 5, the host device will have stored the start times and period of the at least one electronic device. The normal operating phase then commences with the host device transmitting a query packet frame before the start time determined in the initialization phase for the electronic device at 306. The receiver performs channel estimation at 308 based on the header information of a frame, and configures the receiving device accordingly to decode subsequently received sub-frames with the CSI.

Proceeding to 310 the electronic device begins selective wireless channel disruption based on the bits of the data message it is to communicate, where each bit of the data message can disrupt at least one sub-frame or do nothing to at least one sub-frame based on its logic state. As part of this step, the receiving device attempts to decode each sub-frame with the previously applied CSI. Eventually at 312 the receiver generates and transmits a status reply indicating for each sub-frame position received, if that sub-frame was decodable or undecodable. The host device decodes the status reply to extract the message communicated by the electronic device at 314.

As discussed for FIGS. 5 and 6A, the host device can be configured to send multiple query packet frames in rapid succession at the start time, and the electronic device can be configured to repeat its data message in rapid succession at the start time, to ensure at least one query packet frame completely overlaps with the duration of time one of the data messages is communicated by the electronic device. Therefore, steps 306 to 314 are repeated as some of the status replies transmitted by the receiving device may not include a complete data message. The host device can be configured to analyze all the status replies to identify a complete message. For example, the host device can be configured to know in advance the length of the message by the electronic device, including the preamble, identification number and data message. Therefore once the preamble has been identified the host device can easily determine if the entire message appears in the status reply.

In a refinement of this embodiment, while the host device is configured to send a preset number of query packet frames in rapid succession, the host device can be configured to stop sending additional query packet frames as soon a complete data message has been received.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A wireless signal data transmission system, comprising:
   a host device configured to transmit a frame in a wireless channel and configured to receive a status reply, the frame including
   a header, and
   a number of aggregated sub-frames transmitted during a first period of time;
   a receiver configured to
   receive the frame and perform channel estimation in response to information in the header of the frame,
   decode data of the sub-frames based on the channel estimation, and
   transmit the status reply to the host device indicating which sub-frames are decodable and which sub-frames are undecodable based on the channel estimation;
   a device for generating data including a number of data bits each having one of first and second states, where each data bit corresponds to at least one sub-frame of the number of aggregated sub-frames; and
   a channel disruptor coupled to the device and configured to selectively change electrical characteristics of the channel sequentially in time in accordance with an order of the number of data bits during a second period of time overlapped by the first period of time, the electrical characteristics being changed in response to any bit having the first state to render a transmitted sub-frame in the second period of time undecodable by the receiver, and the host device executing an application to decode the status reply and obtain the data generated by the device based on which sub-frames are decodable and undecodable.

2. The system of claim 1, wherein the wireless signal data transmission system is a WiFi compliant wireless system.

3. The system of claim 1, wherein the frame includes n sub-frames, where n is an integer value greater than 0.

4. The system of claim 3, wherein the number of data bits is n/2.

5. The system of claim 4, wherein the frame is a first frame and the host device is configured to repeat transmission of at least one additional frame after the first frame.

6. The system of claim 5, wherein the channel disruptor repeats changing electrical characteristics of the channel sequentially in time in accordance with an order of the number of data bits at least once.

7. The system of claim 1, wherein the frame is transmitted at a first time and the channel disruptor begins selectively changing the electrical characteristics of the channel at a second time proximate to the first time.

8. The system of claim 7, wherein another frame is transmitted at a third time after the first time.

9. The system of claim 8, wherein each sub-frame is time stamped by the host device, and the host device is configured to
   determine a difference in time between the first time and the second time, and
   adjust the third time by the determined difference.

10. The system of claim 1, wherein at least two consecutive sub-frames represent one bit of the data.

11. The system of claim 10, wherein the device is configured to selectively change the electrical characteristics of the channel for a duration of time corresponding to a transmission duration of one sub-frame, followed by a delay corresponding to the transmission duration of one sub-frame before commencing selective changing of the electrical characteristics of the channel for another bit of the data.

12. The system of claim 11, wherein the host device is configured to decode the at least two consecutive sub-frames as representing one state of the bit of data when at least one sub-frame of the at least two consecutive sub-frames is undecodable or decodable.

13. The system of claim 10, wherein the device is configured to selectively change the electrical characteristics of the channel for a duration of time corresponding to a transmission duration of the at least two consecutive sub-frames, and to commence selective changing the electrical characteristics of the channel without delay for another bit of the data.

14. The system of claim 13, wherein the host device is configured to decode the at least two consecutive sub-frames as representing one state of the bit of data when a sub-frame at a specific position of the at least two consecutive sub-frames is undecodable.

15. The system of claim 14, wherein the specific position is determined by a first occurring sub-frame of the at least two consecutive sub-frames that is undecodable.

16. An electronic device for communicating a message in a wireless channel with known wireless channel characteristics, comprising:
   a processing block configured to generate data having at least one bit, each of the at least one bit having a first or a second state; and
   a channel disruptor coupled to the processing block configured to change the wireless channel characteristics of a signal transmitted in the wireless channel, in response to a bit of the data having the first state,
   the wireless channel characteristics being changed relative to the known wireless channel characteristics such that the signal is undecodable by a receiver, and the signal is decodable by the receiver when the bit has the second state.

17. The electronic device of claim 16, wherein the wireless channel characteristics include at least one of phase and amplitude.

18. The electronic device of claim 16, wherein the channel disruptor includes an oscillator configured to generate a sine wave at a frequency of the wireless channel with a wide channel width.

19. The electronic device of claim 16, wherein the channel disruptor includes an antenna and an RF switch.

20. The electronic device of claim 19, wherein the channel disruptor is configured to set the antenna in a non-reflective mode in response to the second state of the bit, and to set the antenna in a reflective mode in response to the first state of the bit.

21. The electronic device of claim 19, wherein the channel disruptor is configured to set the antenna in a reflective mode with 0 degree phase shift in response to the second state of the bit, and to set the antenna in a reflective mode with 180 degree phase shift in response the first state of the bit.

22. The electronic device of claim 16, further including a sensor to provide sensed information to the processing block, the processing block generating the data corresponding to the sensed information.

23. The electronic device of claim 16, further including a power source to provide power to the sensor, the processing block and the channel disruptor.

24. The electronic device of claim 23, wherein the power source includes a power harvester for converting an external source into electrical power.

25. A method for wireless communication of data from a device, comprising:
- transmitting a frame including a header and aggregated sub-frames in a wireless channel, the aggregated sub-frames being transmitted during a first period of time;
- performing channel estimation in response to information in the header of the frame;
- changing by the device, electrical characteristics of the wireless channel sequentially in time in accordance with an order of a number of data bits having first and second states during a second period of time overlapped by the first period of time, the electrical characteristics being changed in response to any bit having the first state;
- determining that a received sub-frame is undecodable due to the sub-frame being transmitted while the electrical characteristics of the channel is changed; and
- transmitting a status reply indicating which sub-frames are decodable and which sub-frames are undecodable based on the channel estimation, thereby representing logic states of the number of data bits.

* * * * *